United States Patent [19]

Gregersen

[11] 4,178,393

[45] Dec. 11, 1979

[54] METHOD OF PREPARING A MONOGLYCERIDE DOUGH ADDITIVE

[75] Inventor: Jens A. H. Gregersen, Skanderborg, Denmark

[73] Assignee: Aktieselskabet Grindstedvaerket, Arhus N, Denmark

[21] Appl. No.: 792,612

[22] Filed: May 2, 1977

[30] Foreign Application Priority Data

May 3, 1976 [GB] United Kingdom ............... 18022/76

[51] Int. Cl.$^2$ ........................... A21D 2/16; A21D 2/32
[52] U.S. Cl. ....................................... 426/653; 426/19; 426/24; 426/549; 426/557; 426/601; 426/662
[58] Field of Search .................... 426/19, 24, 549, 557, 426/547, 653, 662, 588, 622, 601, 611

[56] References Cited

U.S. PATENT DOCUMENTS

| | | | |
|---|---|---|---|
| 2,632,705 | 3/1953 | Sharf | 426/662 X |
| 2,773,771 | 12/1956 | Julian et al. | 426/662 X |
| 2,978,329 | 4/1961 | Cochran et al. | 426/24 |
| 2,978,332 | 4/1961 | Ferrari | 426/653 X |
| 3,034,898 | 5/1962 | Kuhrt et al. | 426/653 X |
| 3,388,999 | 6/1968 | Kuhrt et al. | 426/546 X |
| 3,549,382 | 12/1970 | Hansen | 426/653 |
| 3,661,795 | 5/1972 | Pardun | 426/662 X |
| 3,743,512 | 7/1973 | Hansen | 426/653 X |

*Primary Examiner*—Alvin E. Tanenholtz
*Assistant Examiner*—Esther M. Kepplinger
*Attorney, Agent, or Firm*—Lawrence Rosen; E. Janet Berry

[57] ABSTRACT

The invention concerns a pulverulent, free-flowing monoglyceride based additive for use in the preparation of farinaceous and starch-containing products such as bread, macaroni, spaghetti, noodles and extruded snack products; this additive has been obtained by spray-cooling a substantially dry mixture containing the monoglyceride in molten condition together with at least one phosphatide, preferably lecithin and especially preferred soybean lecithin so that the individual particles will contain the monoglyceride and the phosphatide in substantially constant proportion. The product gives almost as good baking performance or performance in other heating processes for the dough into which it is incorporated as does a so-called monoglyceride-hydrate and has the further advantage of improving the flowing and packing properties of the pulverulent mixture.

9 Claims, 3 Drawing Figures

METHOD OF PREPARING A MONOGLYCERIDE DOUGH ADDITIVE

FIELD OF THE INVENTION

This invention relates to a pulverulent, free-flowing monoglyceride baking aid or additive for use in the preparation of bread, extruded snack products, macaroni, noodles, spaghetti and similar farinaceous or starch-containing products on the basis of monoglycerides of saturated $C_{12-24}$ fatty acids as starch modifying agents in order to improve the quality of the final product, the monoglyceride product according to the invention containing at least one additive. The invention also relates to a method for preparing the baking aid and a method for preparing bread, snack product, macaroni, noodles and the like.

BACKGROUND OF THE INVENTION

Monoglycerides are widely used as emulsifiers as well as starch modifying agents. The affinity to starch renders them particularly useful in bakery products and other starch containing foods, for instance with respect to improving bread texture.

In bread, the monoglycerides prevent or reduce staling and thereby increase softness and shelf life. The theory is that staling to a great extent is caused by the retrogradation of the gelatinized starch, particularly of the amylose fraction of the starch. Amylose forms a helix and a monoglyceride molecule fits into this helix. A monoglyceride molecule entrapped in the amylose helix represents a water-insoluble complex which will not take part in the progressing retrogradation of amylose. Thereby the staling tendences are reduced.

In spaghetti, macaroni, noodles and similar products the monoglycerides ensure a firm, non-sticky consistency when the product is cooked.

Monoglycerides are of a polymorphic nature. In the solid state two substantially different crystal forms exist, an unstable $\alpha$ (alpha) crystal form and a stable and more compact $\beta$ (beta) crystal form. When suspended in a water phase and heated both crystal forms will hydrate and convert into an active state or form with affinity to starch and able to form a complex with amylose. Monoglyceride powder in $\alpha$-crystal form gives the effects referred to above because the $\alpha$-form at room temperature easily converts into an active amylose complexing state whereas ordinary monoglyceride powder in the $\beta$-crystal form at room temperature is almost ineffective in this respect. It is, however, very difficult or even impossible to prepare a composition of monoglycerides in the $\alpha$-crystal form retaining this crystal form for a reasonable period of time. This problem can be overcome in a rather satisfactory manner by ensuring that the stable $\beta$-crystal form is converted into an active form during the baking process for the bread or heating process for the other types of products mentioned. As this conversion is ordinarily limited by the time available and the temperatures prevailing during baking processes or the processes used for preparing macaroni, noodles etcetera, it is necessary that the $\beta$-crystals to convert are very small, i.e. that the monoglyceride product is very finely crystallized with a large surface exposed to the water phase. Furthermore, the monoglyceride must be extremely well distributed in the dough in order to achieve maximum effect thereof.

In present practice, monoglycerides for bread and other farinaceous products as mentioned are normally used in the form of a 25% dispersion made by admixing one part of monoglyceride into three parts of hot water. On cooling, the monoglyceride will form micro-crystals suspended in water. Just after the crystallization, a substantial portion of the polymorphic monoglyceride will be present in an $\alpha$-crystal form. The $\alpha$-crystals are thermodynamically unstable and on standing will be transformed into a stable $\beta$-crystal form, still as very small particles.

If a freshly prepared dispersion is not agitated it will stiffen in course of the crystal transition period. To obtain a smooth paste, agitation is normally provided in the transition period, and the transition is accelerated by special means. Monoglyceride in this paste form is usually referred to as a "hydrate;" however, the water present is not water of crystallization in the normal sense. A hydrate prepared *lege artis* will be of full effect when added to a bread dough, and the effect of the monoglyceride can be observed as an improvement of the bread volume and the softness of the crumb, especially the softness after some days of ageing. The monoglyceride will increase volume and decrease crumb firmness. The reason is that the $\beta$-crystals when present as described are intimately distributed in the dough and readily convert into an active form with affinity to starch during the baking process.

If, on the other hand, the monoglyceride in the stable $\beta$-crystal form is added to the dough as an ordinary non-hydrated powder in the same dosage as the hydrate, calculated as the amount of dry monoglyceride, only a minor effect is observed. The reason probably is that under these circumstances, when the $\beta$-crystal form is converted into an active form during the baking or other treating process the migration of the monoglyceride (having the active form) to the starch molecules is taking place locally only and is too slow to ensure the effect with respect to improving bread texture.

The dispersion or hydrate referred to above is normally prepared at central factories separate from the ultimate user thereof; the ultimate user will be the baker, the bread factory, the noddle, macaroni, spaghetti factory or the manufacturer of extruded snack-products. The reason is that the know-how involved in preparing the dispersions and the hydrates of monoglycerides is rather complicated if a first class product is to be obtained.

For obvious reasons it is desirable to supply a dry, free-flowing pulverulent product to the ultimate user. Firstly, thereby the cost of distributing comparatively large amounts of water (three times the amount of monoglyceride) would be saved and also the costs involved in packing a liquid paste rather than a powder; the latter could be packed simply in bags. Also, in many cases it is easier to admix a powder into the dough than a paste or liquid hydrate and also the pulverulent form would have the advantage that it could be admixed with the flour.

SUMMARY OF THE INVENTION

Accordingly, it is the primary object of the present invention to provide an improved dry, pulverulent monoglyceride product for use in preparing bread, extruded snack-products, macaroni, noodles and spaghetti and similar farinaceous products whereby the monoglycerides are easy to admix with the other components of the dough in dry, free-flowing, pulverulent form.

Another object of the invention is to provide a method for preparing a dry, free-flowing, pulverulent monoglyceride product for use in bread, macaroni, spaghetti, noodles, extruded snack-products and similar farinaceous food products. A further object is to provide a method for improving the keeping qualities and similar properties of bread and other farinaceous products in the respects discussed.

Surprisingly it has been found that these objects can be achieved if the monoglycerides are incorporated into the dough for the products mentioned in the form of pulverulent mixture of the monoglyceride and a phosphatide (phospholipid) obtained by mixing the two components together in molten condition and spray-cooling the molten blend.

Accordingly, the invention relates to a pulverulent, free-flowing monoglyceride-based baking aid for use in the preparation of farinaceous and starch-containing products such as bread, macaroni, spaghetti, noodles and extruded snack products, said baking aid being prepared on the basis of distilled monoglycerides of saturated $C_{12-24}$ fatty acids and containing at least one additive, and according to the invention the pulverulent mixture has been obtained by spray-cooling a substantially anhydrous mixture containing the monoglyceride in molten condition together with at least one phosphatide (phospholipid) whereby the individual particles of the powder will contain the monoglyceride and the phosphatide in substantially constant proportion.

Such baking aid considerably decreases the problems discussed above and moreover it has surprisingly been found that a distinct technological advantage is obtained with respect to the preparation of the product in a spray tower and the immediate packing thereof. The various aspects including these will be discussed more fully hereinafter, mainly with reference to using lecithin and especially soya bean lecithin as the phosphatide but before that it is deemed expedient to discuss certain more or less relevant prior art.

PRIOR ART

U.S. Pat. No. 3,549,382 describes the preparation of a pulverulent monoglyceride preparation, usable as antistaling agent for use in baking, especially for incorporating into yeast-raised baked products, whereby an aqueous emulsion of monoglyceride and hydroxylated lecithin is spray-dried or cooled and dried in some other manner. Though claim 1 of the patent does not prescribe the presence of water, all Examples do show water present. At any rate, it seems essential that the lecithin is hydroxylated. Though hydroxylated lecithin can be employed in the present product (and method), there is preferably employed non-hydroxylated lecithin which is a great advantage because hydroxylated lecithin is much more expensive than un-hydroxylated lecithin. In the known art, however, one reason why the lecithin must be hydroxylated is that otherwise it will be insufficiently hydrophilic to be well distributed in the aqueous mixture of monoglyceride and hydroxylated lecithin.

Danish patent specification No. 131,894 describes and claims an emulsifier for use in emulsions of oil and water, including food products of this type, which comprises 50–90 p.b.w. of a mixture of mono- and diglyceride esters of $C_{16-22}$ fatty acids and 50–10 p.b.w. of a partially hydrolysed vegetable phosphatide, e.g. soy bean lecithin, containing 2–15% b.w. of lysophosphatides. The specification does not mention bread baking and similar purposes among those for which the emulsifier is meant and this use is not obvious on the background of this prior art because the effect of the monoglyceride in bread baking, as antistaling agent, is not a simple emulsifier effect. Moreover, the present invention is not concerned with hydrolysed phosphatides or with lysophosphatides. Actually it is essential for that prior art that the phosphatide is hydrolysed because the two fractions into which the phosphatide molecule is split act differently according to the said Danish specification; the alcohol-soluble fraction containing the majority of the cholin-lecithins are useful for oil-in-water emulsions whereas the alcohol-insoluble fraction, containing the majority of the cephalins, is useful for water-in-oil emulsions.

Danish patent application No. 4699/67, claiming priority from U.S. application No. 581,173 of 22nd Sept. 1966, now Pat. No. 3,493,387, shows that cooling under atomisation or spraying of a molten mixture containing monoglycerides and hydroxylated lecithin together with fatty acids monoesters of 1,2-propandiol gives an emulsifier for food articles and having substantial α-crystallinity. However, again the final product is an emulsifier and the phosphatide a hydroxylated lecithin so that no conclusions regarding effect in farinaceous products can be drawn. The very fact that the document—incidentally like Danish specification No. 131,894—proposes spray-cooling does not suggest any particular effect in spraying and packing technology or in baking and similar processes.

U.S. Pat. No. 3,388,999 shows, i.a., that lecithin stabilises the α-crystal form of monoglycerides in aqueous dispersion. However, this does not permit any conclusions as to the stability of an active form as referred to hereinabove in dry form or in a dough into which it is incorporated in dry, pulverulent form. In fact, the problems to overcome by the present invention to a high degree are caused by the desire of using a dry form of the monoglycerides instead of the aqueous dispersion normally used in the past.

Danish patent specification No. 112,247 and its counterparts elsewhere such as British patent specification No. 1,082,283 shows that a particulate combined stabiliser/emulsifier for various food products can be made by spray-cooling a molten mixture containing a monoglyceride and a stabiliser. The product especially is for use as emulsifier/stabiliser in ice-cream. The patent does not mention phosphatides and they are hardly embraced by the expression "stabilisers" since these are defined as being of the carbohydrate or protein type, not of the lipid type.

DETAILED DESCRIPTION OF THE VARIOUS EMBODIMENTS OF THE INVENTION

Figure 1:
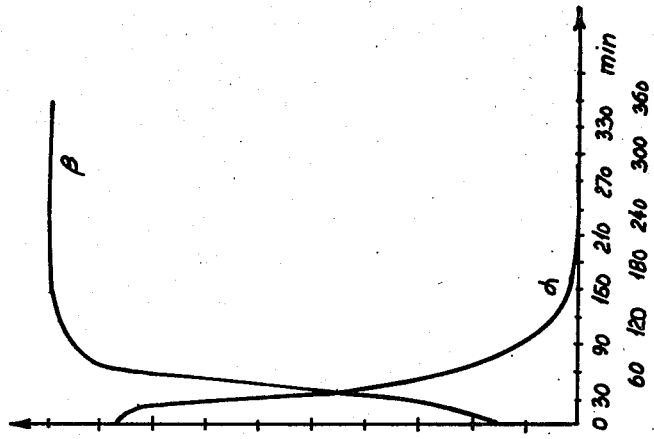

It has been found that the monoglyceride is present in the composition according to the invention in a stable physical β-crystalline form able to convert into the active amylose complexing form during baking processes for making bread or similar products such as cakes, or during manufacturing processes used for making extruded snack-products or for making farinaceous products such as noodles, macaroni, spaghetti or the like. Furthermore, the product is in the form of a fine powder with excellent free-flowing properties which can very easily be admixed with flour and the other ingredients used when preparing the farinaceous product such as those mentioned. The effect of the product in bread-making and in making macaroni, noodles, spaghetti and extruded snack-products is very close to that of a monoglyceride hydrate.

The monoglyceride used may be a commercial distilled monoglyceride containing for instance from about 80% or 85% up to about 98% of monoglyceride, for instance about 90% b.w. of monoglyceride (the balance being diglyceride, triglyceride and free glycerol as commonly known in the art). The fatty acid residues in the monoglycerides may be of any saturated fatty acid having from 12 to 24 carbon atoms. Various distilled monoglycerides on the basis of fully hardened, commercial fats are available and any such commercial product can be used. A very convenient monoglyceride product is a distilled monoglyceride containing about 90% monoglyceride and prepared on the basis of fully hardened lard. The fatty acid residues are about 62% stearic, about 32.5% palmitic, about 3.2% myristic and about 2.3% arachidic acid. As the predominant compound in this product is 1-monostearin, it is often referred to as GMS (short for glyceryl monostearate) and this name will be used hereinafter, it being understood that the monostearate is highly admixed with the other fatty acid monoglycerides; the term GMS is also used for similar products based on, e.g., hardened beef tallow or soybean oil, the composition of fatty acids differing but with stearic acid predominant.

The phosphatide is preferably a lecithin and particularly preferred are various edible grades of soybean lecithin because such lecithins are readily available. The lecithin may be of a comparatively crude grade or a more or less purified lecithin such as the grades called unbleached, bleached, fluid, plastic or edible lecithin. Also, it can be added contained in a carrier wherein the lecithin is a natural constituent, e.g. full fat soya flour, dried whole egg or dried egg yolk.

Accordingly, according to the invention the phosphatide preferably is a lecithin and especially it is preferred that it is a non-hydroxylated soybean lecithin. Actually, a hydroxylated lecithin may well be used but it does not seem to involve any advantages and as the material is more expensive than un-hydroxylated lecithin its use is not warranted.

As mentioned, the materials including the phosphatide should be substantially anhydrous. Hereby is only meant that it should be a substantially dry material, i.e. naturally dry as obtained by normal handling of it; for instance, the materials should be in equilibrium with the atmosphere prevailing at the handling side. The material should not be moistened but on the other hand it is not necessary to desiccate it by special precautions.

The monoglyceride normally will constitute the major portion of the combined monoglyceride/phosphatide, especially monoglyceride/lecithin product. Though the ratio is not very critical, it is preferred according to the invention that the contents of phosphatide is 0.1 to 40%, calculated on the weight of the mixture. The higher contents especially apply when a comparatively crude grade of lecithin is employed. Also, in some instances it may be useful to have a high amount, e.g. 30% or even 35% (calculated on the weight of the mixture) present, viz. when it is desired to obtain a bread or other baked product having a particularly soft crumb.

A more preferred range for the lecithin (phosphatide) content is 0.2 to 30% and still more preferred 0.5 to 10%, calculated on the weight of the mixture.

Though the composition described has excellent flowing properties, it has been found that the properties as a free-flowing powder can be still further improved by the addition of a carrier substance in the form of an edible, finely pulverulent solid carrier material, this being incorporated as part of the individual particles of the pulverulent mixture and incorporated into it by having been present in solid form in the molten monoglyceride prior to spray-cooling thereof. Preferably, such material has an average particle size of 20–100 $\mu$m, but an average particle size up to 150 $\mu$m or even more is permissible (for determination of average particle size see page 27). The preferred solid carrier material according to the invention is full fat soybean flour and as other examples may be mentioned skim milk powder, microcrystalline cellulose, defatted soybean flour, wheat gluten, sodium caseinate, and maltodextrins. The amount of carrier substance, if present, is preferably between 3% and 40% of the weight of the composition. However, care must be taken that the sum of the amounts of solid carrier material and phosphatide does not exceed 50% of the weight of the composition because about 50% monoglyceride should be present in order to obtain the desired complexing activity with the amylose without need of using excessive amounts of the composition.

The invention also relates to a method for producing the composition described. This method consists in melting a monoglyceride of saturated $C_{12-24}$ fatty acids or a mixture of such monoglycerides, adding at least one substantially dry phosphatide (phospholipid) and spray-cooling the mixture without adding water. As is well known in the art, the particle size of a spray-cooled product can be influenced by the choice of spraying nozzles or the speed of a spinning disc. It is preferred to conduct the spray-cooling process in a manner so as to ensure a pulverulent product having an average particle size between 10 and 150 $\mu$m, especially between 20 and 100 $\mu$m and very convenient between 30 and 80 $\mu$m, for instance about 50 $\mu$m.

If a carrier substance is desired as component of the composition, such carrier is added to the molten mixture of the two other components prior to spray-cooling. The average particle size of the carrier substance is as stated above, i.e. preferably between 20 and 100 microns, and the amount thereof is preferably between 3 and 40% of the weight of monoglyceride plus phosphatide plus carrier.

The reason for the effect of the composition as described (with or without carrier) is not fully known but a tentative explanation might be as follows, it being understood that the invention should not be limited by these theoretical considerations. The baking effect is due to a reaction between monoglyceride molecules and amylose molecules in the dough. From earlier work by N. Krog in J. Food Technology (1970) 5, p. 77–87 it is known that high amylose complexing ability is related to monoglyceride dispersions in $\alpha$-crystalline form. Optimal effect is related to a good homogenous distribution in the dough. The saturated monoglycerides melt at about 70° C. and cannot be dissolved or dispersed in water at a (normal) dough temperature of about 30° C. Therefore, the distribution of the monoglycerides in the dough is dependent on the particle size. Practical reasons give a lower limit for particle size when spray crystallising and this is the reason why pure monoglycerides are not normally added directly to doughs for bread. It is, however, comparatively easy to form them to a "hydrate" (aqueous dispersion) and this can be dispersed homogenously into the dough. The effect observed using a β-crystalline hydrate in breadmaking is explained by the fact that the β-crystals at the elevated temperatures reached during the baking will disperse in the water phase of the dough and form the active α-crystalline form. The rate of the transformation (and hydration) is greatly influenced by the physical form of the monoglyceride, and when reaction time during the baking process is limited, the physical form is of utmost importance for the result in practical application of monoglycerides.

It is believed that the lecithin or other phosphatide added as modifier to the monoglyceride plays an essential part in the formation of a monoglyceride powder which can be homogenously distributed into a dough and rapidly converted into an active form; whereas it is believed that the carrier possibly added is of little importance for the baking performance but sometimes is of benefit to the performance of the freshly prepared powder, especially to the flowability.

We have formed the hypothesis that lecithin products and other phosphatides influence the crystal formation of monoglyceride and transition from the initial α-state to the stable β-state leading to products enabling the homogenous distribution of the monoglycerides into a dough and being transformed at a fast rate during baking processes or other manufacture into an amylose complexing state. According to that hypothesis, a continous phase of an amorphous nature is formed between individual crystals in the various particles. The crystalline areas are less compact and so oriented that hydration is favoured. Depending on the reaction time available during application (i.e. baking or manufacture of noodles etc.) perhaps only minor improvements in morphology are required to increase rate of hydration and transformation sufficiently. According to the hypothesis, the lecithin or other phosphatide, which is of a lipid nature, interferes with the crystallization of the monoglyceride, perhaps acting as en accelerator in crystal formation favouring microcrystals.

By X-ray analysis we have observed that a modifier of a lipid nature like lecithin does in fact accelerate the transition rate from the initial α-form to β-form, which is expected to be an improvement in the physical form; and in baking test unhydrated monoglyceride powders are improved when integrated with the same modifiers. Results of X-ray analysis and baking test are given in the following figures and tables.

In the drawing, the crystal inversion is illustrated by graphs.

FIG. 1 shows the crystal inversion α→β at 55° C. of GMS

Figure 2:
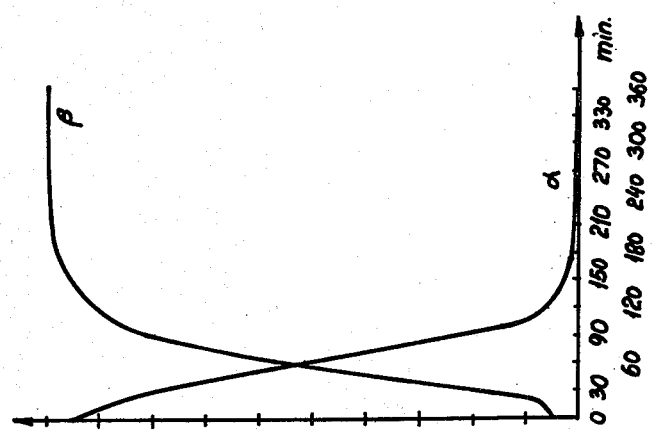
Figure 3:
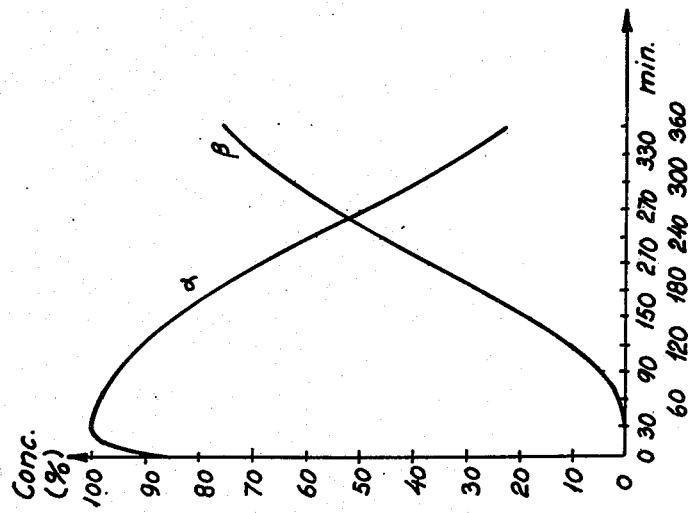

FIG. 2 the crystal inversion α→β at 55° C. of a homogenous mixture of GMS and lecithin (10:1), prepared at 80° C., and FIG. 3 the crystal inversion α→β at 55° C. of a homogenous mixture of GMS and lecithin (80:20) prepared at 80° C.

In all of the three cases, the crystal inversion was determined by densitometry of films from X-ray diffraction. A comparison of FIG. 1 with the two other figures clearly shows that an admixture of lecithin to GMS greatly increases the rate of converting the α-crystal form into the β-crystal form. With 10% lecithin, half of the α-form is converted into β-form in an hour whereas this requires more than four hours with the pure GMS.

The carrier does not seem essential for this conversion if the carrier does not contain lecithin or other phosphatides but mainly aims at improving the flowing properties of powder.

Surprisingly, it has been found that the addition of the phosphatide gives a distinct technological advantage in preparing the product, viz. the flowability and packability are greatly improved.

When a distilled monoglyceride of saturated fatty acids is spray crystallised the monoglyceride has α-crystal form immediately after the crystallisation. In this form, the material has a tendency to pack together or even conglomerate and if the product is crystallised in very fine particle size (very small particles) the flow properties of the product resemble those of melting snow. A rearrangement from the α-crystal form, labile at room temperature, into the stable β-crystal forms is rather slow and may require several hours. After the rearrangement into β-crystal form the product is free flowing and can easily be removed from apparatus, pass sieves, be packed into bags and generally handled as required.

These properties of the α-crystal form obviously give great difficulties when it is desired to spray crystallise the distilled monoglyceride in a very small particle size (e.g. 20–150μ) and in industrial scale. The product forms lumps and aggregates in the spray tower and it is impossible to sieve and weigh it in automatically working apparatus.

The influence of lecithin or other phosphatide as mentioned above seems to be that rearrangement of the α-crystal form into the β-crystal form is greatly accelerated, and by practical experiments thus have been found to have a decisive influence upon spray-crystallisation when carried out to a small particle size. This effect can be illustrated as follows:

When using a conventional spray tower and spinning disc (spray disc) it is impossible to spray-crystallise a distilled monoglyceride into fine particles because of aggregation of the product. The crystallisation can be made by the aid of spray nozzles but only with decreased capacity of the spray tower and the spray-crystallised product can only difficultly be sieved and packed with automatically working apparatus.

If, however, 2% of soybean lecithin is added to the molten monoglyceride prior to spray-crystallisation, this can be carried out by spinning discs with great ease and with full utilisation of the capacity of the spray tower. No lump-formation occurs and the product can be sieved and packed into bags with the aid of automatically operated apparatus.

Practical experiments have also shown that it is possible to spray-crystallise a product of the following composition:

distilled monoglyceride—82% b.w.
maltodextrin—8% b.w.
sodium caseinate—8% b.w.
guar gum—2% b.w.

on conventional spray tower by aid of a spinning disc. The finished product has some tendency to form lumps and the process therefore can only be conducted with reduced capacity of the spray tower. The flow properties of the product also prevent it from being sieved and filled into bags by automatically working apparatus.

By the addition of 0.5% soybean lecithin before the spray-crystallisation the flow properties of the spray-crystallised product change so much that the capacity of the spray tower can be utilised fully, corresponding to an increase of 25–30%. The changed flow properties involve that the product can be sieved and filled into bags automatically.

The lecithin employed was of same grade as described in Example 1.

Table 1

Baking tests with wheat loaves

| Test No. | Type of additive | Dosage g/2000 g of flour | Bread volume ml | Crumb firmness after storage | | |
|---|---|---|---|---|---|---|
| | | | | 1 day | 2 days | 7 days |
| | Control without additive added | — | 2554 | 258 | 318 | 428 |
| 103-11 | GMS-hydrate (25% GMS) | 40 | 2980 | 124 | 171 | 222 |
| 103-2 | 90% GMS 10% Lecithin | 10 | 2890 | 156 | 216 | 266 |
| 103-3 | 82% GMS 9% Lecithin 9% Gluten | 11.1 | 2925 | 155 | 202 | 260 |
| 103-4 | 82% GMS 4.5% Lecithin 4.5% Soy bean oil 9% Gluten | 11.1 | 2925 | 152 | 214 | 262 |
| 103-5 | 82% GMS 4.5% Lecithin 4.5% Soy bean oil 9% Full fat soy bean flour | 11.1 | 2900 | 150 | 193 | 257 |
| 103-8 | 82% GMS 9% Crude soy bean lecithin 9% Full fat soy bean flour | 11.1 | 2850 | 146 | 206 | 237 |
| 84-7 | GMS-hydrate (25% GMS) | 40 | 2860 | 115 | 180 | 252 |
| 84-8 | 82% GMS 4.5% Lecithin 13.5% Full fat soy bean flour | 10 | 2850 | 173 | 213 | 287 |
| 84-9 | 82% GMS 9% Lecithin 9% Full fat soy bean flour | 10 | 2810 | 140 | 176 | 250 |
| 84-10 | 82% GMS 13.5% Lecithin 4.5% Full fat soy bean flour | 10 | 2875 | 141 | 177 | 247 |

Experiments

Some tests show that the monoglyceride/lecithin powder, with or without carrier, do perform almost as good in baking as does the monoglyceride hydrate.

Doughs were prepared from:
2000 grams of wheat flour
30 grams of salt
30 grams of sugar
90 grams of yeast, and
1160 grams of water.

To each dough was added an additive or additive combination as mentioned in table 1.

The doughs were kneaded for 15 minutes in an "Artofix" mixer and left for 2×10 minutes. The rising time was 45 minutes at 31° C., and the breads were baked at 225° C. for 30 minutes.

After being taken from the oven and cooled, the volume of the breads was measured, and they were then packed into plastic bags and stored at 5° C. After 1 day, 2 days and 7 days, respectively, the crumb firmness was tested by means of an "Instron" tester as follows: The bread is cut into slices of 11 mm thickness, and the firmness of the crumb is determined by the force (in pond/cm$^2$) which is necessary to press a plunger with an area of 25 cm$^2$ into the crumb to a depth of 5.5 mm.

The results of the testing are given in the following table 1.

These baking tests show that GMS with lecithin gives almost as good a bread volume as the GMS-hydrate and that the volume is perhaps improved a bit by the further addition of carriers during the spray-cooling of the combined GMS/lecithin product. It should be mentioned that the differences in bread volume are so small as to be scarcely significant. The keeping qualities of the bread, expressed as the crumb firmness after storing, likewise are almost as good when using the combined product GMS/lecithin without or especially with added carrier as when using the GMS-hydrate. It should be observed that the dosages stated in the Table are dosages of the products defined; thus, 40 g of GMS-hydrate contains 10 g of GMS.

Another series of experiments were conducted partly with a small and partly with a high amount of lecithin in the additive. The additives had the compositions shown in tables 2–4 and it will be found that there in each instance is compared with the performance of hydrate (25% GMS, 75% water, no phosphatide). The additives were made by melting the GMS (on the basis of fully hardened fat), adding lecithin and in some instances pulverulent substances as and in amounts as indicated in the tables. The melts with added material were thereafter spray-crystallised in a conventional spray tower by the aid of spinning discs (the speed of which is stated in most of the cases), except for products Nos. 3 and 4, not containing lecithin, which could not be spray-cooled at satisfactory rate and with satisfactory flow properties by a spinning disc and therefore had to be passed through a spray nozzle (for product 3 at a pressure of 18 kg). In all instances the inlet temperature of cooling air into the spray tower was about 15° C. and the exit temperature about 30° C. The spray-crystallised powders were discharged by the aid of a cyclone.

The products were subjected to baking tests as described hereinbefore and the bread volumes as well as the softness (according to "Instron" tests) as average of the measurements for 1st, 3rd and 7th day are given in the tables. It should be noted that the spray product No. 3 has been tested in two of the tables and given slightly different baking performance. This also applies to the hydrate and is caused by variations in the flour quality used in the various baking tests. Each table comprises baking tests conducted with the same flour.

Table 2

| Product No. | Composition % b.w. Distilled monoglyceride | Guar Gum | Soybean flour | Lecithin | Water | Spinning disc, r.p.m. | Sieve analysis % >149 μ | Average particle size | Dosage in flour for dough, % | Average bread volume, cm³ | Average of "Instron" measurements p/cm² |
|---|---|---|---|---|---|---|---|---|---|---|---|
| Hydrate 1016/4-1 | 25 | | | | 75 | | | | 2.0 | 2933 | 129 |
| Spray-product 1 | 82 | 17.5 | | 0.5 | | | 7.0 | | 0.61 | 2947 | 128 |
| Spray-product 2 | 82 | 17.5 | | 0.5 | | | 10.2 | | 0.61 | 2928 | 133 |
| Spray-product 3 | 100 | | | | | 18 kg | 30.8 | | 0.5 | 2793 | 161 |
| Spray-product 4 | 100 | | | | | | 27.1 | | 0.5 | 2747 | 166 |
| Number of measurements on which average is based | | | | | | | | | | 3 | 9 |
| Standard deviation for averages | | | | | | | | | | 33.1 | 5.4 |

Table 3

| Product No. | Composition % b.w. Distilled monoglyceride | Guar Gum | Soybean flour | Lecithin | Water | Spinning disc, r.p.m. | Sieve analysis % >149 μ | Average particle size | Dosage in flour for dough, % | Average bread volume, cm³ | Average of "Instron" measurements p/cm² |
|---|---|---|---|---|---|---|---|---|---|---|---|
| Hydrate 1016/4-1 | 25 | | | | 75 | | | | 2.0 | 3177 | 107 |
| Spray-product 5 | 82 | 17.5 | | 0.5 | | 12.000 | 5.1 | | 0.61 | 3160 | 128 |
| Spray-product 6 | 98 | | | 2.0 | | 11.000 | 3.3 | | 0.5 | 3170 | 141 |
| Spray-product 3 | 100 | | | | | 18 kg | 30.8 | | 0.5 | 3015 | 156 |
| Number of measurements on which average is based | | | | | | | | | | 3 | 9 |
| Standard deviation for averages | | | | | | | | | | 22.2 | 3.8 |

Table 4

| Product No. | Composition % b.w. Distilled monoglyceride | Guar Gum | Soybean flour | Lecithin | Water | Spinning disc, r.p.m. | Sieve analysis % >149 μ | Average particle size | Dosage in flour for dough, % | Average bread volume, cm³ | Average of "Instron" measurements p/cm² |
|---|---|---|---|---|---|---|---|---|---|---|---|
| Hydrate 1016/4-1 | 25 | | | | 75 | | | | 2.0 | 3188 | 106 |
| Spray-product 7 | 82 | | 17.5 | 0.5 | | | | | 0.61 | 3130 | 131 |
| Spray-product 8 | 50 | | 20.0 | 30.0 | | | | | 0.61 | 3140 | 105 |
| Spray-product 9 | 50 | | 30.0 | 20.0 | | | | | 0.61 | 3160 | 118 |
| Spray-product 10 | 82 | 17.5 | | 0.5 | | | | | 0.61 | 3153 | 130 |
| Number of measurements on which average is based | | | | | | | | | | 3 | 9 |
| Standard deviation for averages | | | | | | | | | | 24.0 | 3.0 |

The invention finally relates to a method for preparing bread and other farinaceous products such as extruded snack products, noodles, macaroni, spaghetti and the like, and this method is characterized in incorporating into the dough for preparing such products an effective amount of an additive as described, and otherwise preparing the product in the conventional manner. The amount of the additive described to incorporate into the dough may vary somewhat but will usually be of the order about 0.5% to 0.7%, calculated on the amount of flour. It will seldom be useful to incorporate less than about 0.25% of the product in question, and the effect will not normally be increased substantially by using above 1.5% thereof, calculated on the weight of flour on which to base the dough.

In the following, some Examples will illustrate the preparation of the pulverulent, free-flowing monoglyceride/phosphatide product.

EXAMPLE 1

1800 g of distilled monoglyceride, prepared from hardened beef tallow, were heated at 85° C. While stirring, 200 g of soybean lecithin were added to the melt. The lecithin was an alcohol-soluble fraction having the following analysis values: phosphorus, 0.84% P; nitrogen, 0.75% N; phosphatidylcholine, 27.4%; phosphatidylethanolamine, 11.5%. The hot mixture of distilled monogelyceride and lecithin was sprayed on a spinning disc at 16000 r.p.m. in a spray tower (diameter 3 meters) under the simultaneous blowing of air at 15° C. The air left the tower at a temperature of 30° C. The spray-cooled powder is discharged from the air by a cyclone. The powder was that tested according to the baking experiment above, denominated Test No. 103-2.

EXAMPLE 2

1640 g of distilled monoglyceride, prepared from hardened lard, was heated at 85° C. 270 g of fractionated soy bean lecithin (same type as in Example 1) and 90 g of full fat soy bean flour were added under stirring. The hot mixture was cooled as described in Example 1.

This powder was tested in the Test denominated 84-10.

EXAMPLE 3

The procedure was as in Example 2, using the following ingredients:
1640 g of distilled monoglyceride
180 g of crude, unfractionated soy bean lecithin
180 g of full fat soy bean meal.
The powder was that tested in Test No. 103-8.

Determination of the average particle size

The average particle size as mentioned in the present specification and claims is determinated in the following way:

The product is sifted on an air sifter having a certain number of sieves e.g. sieves with the following meshes to DIN standards: 74 μm, 100 μm and 149 μm. An air sifter produced by the company Alpine A.G. 89 Augsburg, Germany, may be used.

The percentual amount of product retained on each sieve is measured and the results are plotted on an arithmetic probability graph paper having as ordinate the percentual amount of product retained on each sieve and as abscissa the mesh of the various sieves.

A line is drawn on basis of the individual dots and the average particle size is defined as the value on the abscissa which on said line corresponds to the value 50% on the ordinate.

What we claim is:

1. A method for preparing a pulverulent, free-flowing monoglyceride additive in the form of individual particles for use in the preparation of farinaceous and starch-containing edible products wherein the individual particles contain in substantially constant proportion (a) at least one monoglyceride and (b) at least one lecithin; comprising the steps of melting at least one distilled monoglyceride of saturated $C_{12-24}$ fatty acids, adding at least one substantially dry lecithin in an amount so as to constitute 0.1–40% of the weight of the mixture and spray-cooling the resultant mixture substantially without adding water to obtain said individual particules.

2. A method as claimed in claim 1, wherein the lecithin is non-hydroxylated soybean lecithin.

3. A method as claimed in claim 1, wherein the amount of lecithin is 0.2–30% by weight of the mixture.

4. A method as claimed in claim 2 wherein the amount of lecithin is 0.5–10% by weight of the mixture.

5. A method for preparing a pulverulent, free-flowing monoglyceride additive in the form of individual particles for use in the preparation of farinaceous and starch-containing edible products, wherein the individual particles contain in substantially constant proportion (a) at least one monoglyceride, (b) at least one lecithin and (c) at least one edible finely pulverulent solid carrier material; comprising the steps of adding at least one lecithin and at least one edible, finely pulverulent, substantially dry, solid carrier material selected from the group consisting of full fat soybean flour, defatted soybean flour, skim milk powder, microcrystalline cellulose, wheat gluten, sodium caseinate and maltodextrins, to at least one distilled monoglyceride of saturated $C_{12-24}$ fatty acids in molten condition, the amount of lecithin being 0.1–40% of the weight of components (a) and (b) and the amount of pulverulent carrier material being 3–40% of the weight of components (a), (b) and (c), the sum of the amount of carrier and lecithin not exceeding 50% by weight of the resulting blend and thereafter spray-cooling the resulting blend without adding water to obtain said individual mixtures.

6. A method as claimed in claim 5, wherein the lecithin is a non-hydroxylated soybean lecithin.

7. A method as claimed in claim 5, wherein the average particle size of the edible, pulverulent carrier material is between 20 and 100 μm.

8. A method as claimed in claim 5, wherein the amount of lecithin is 0.2–30% by weight.

9. A method as claimed in claim 8, wherein the amount of lecithin is 0.5–10% by weight.

* * * * *